(12) United States Patent
Kuroda et al.

(10) Patent No.: US 6,418,112 B1
(45) Date of Patent: Jul. 9, 2002

(54) INFORMATION RECORD MEDIUM

(75) Inventors: Kazuo Kuroda; Shoji Taniguchi, both of Tokorozawa (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/313,364

(22) Filed: May 18, 1999

(30) Foreign Application Priority Data

May 20, 1998 (JP) .......................................... 10-138599

(51) Int. Cl.⁷ ................................................. G11B 7/24
(52) U.S. Cl. ................................................. 369/275.4
(58) Field of Search ........................... 369/44.26, 275.1, 369/275.3, 275.4

(56) References Cited

U.S. PATENT DOCUMENTS

| | | | | |
|---|---|---|---|---|
| 4,885,736 A | * | 12/1989 | Horie | |
| 5,822,285 A | * | 10/1998 | Rugar et al. | 369/275.4 X |
| 6,055,218 A | * | 4/2000 | Takeda et al. | 369/275.4 X |
| 6,075,761 A | * | 6/2000 | Akiyama et al. | 369/275.4 X |

* cited by examiner

Primary Examiner—W. R. Young
(74) Attorney, Agent, or Firm—Nixon & Vanderhye

(57) ABSTRACT

An apparatus (C) manufactures an information record medium (DK), which has a track (G, L), on which information is optically recorded. The apparatus is provided with: a track forming device (40, 43, 50) for forming the track; and a transition portion forming device (40, 43, 50) for forming a transition portion (MG) for transiting an irradiation position (SP) of a light beam ($L_G$, $L_L$), which is used for illegally copying the information on the formed track, from an irradiation track (G2), which is irradiated by the light beam, to an adjacent track (G1), which is adjacent to the irradiation track and on which the information is recorded before the information is recorded on the irradiation track, such that the formed transition portion is continuous with the formed track.

1 Claim, 6 Drawing Sheets

DISC ROTATION DIRECTION

INFORMATION RECORD MEDIUM

BACKGROUND OF THE INVENTION

1. Field of the Invention

The present invention relates to an information record medium having a structure to prevent information legally or formally recorded thereon from being illegally copied and distributed, and an apparatus for manufacturing the record medium.

2. Description of the Related Art

Video information such as a movie is protected by a copy right, so that it is basically prohibited to copy such information without a permission of the copy right holder.

On the other hand, it is necessary for the copy right holder to prevent such an illegal copy effectively.

There is one method to prevent an illegal copy, for example, in which copy control information is recorded together with video information to be primarily recorded and indicates whether the video information is prohibited to be copied or allowed to be copied just once after recording, so that, when the video information is to be copied, a copy machine (e.g., an optical disc player or recorder) reproduces the copy control information and recognizing whether the video information is prohibited to be copied or allowed to be copied just once after recording on the basis of the reproduced copy control information, to thereby conduct the copy restriction.

However, in case that a so-called hard copy is performed from the information record medium on which the video information is recorded, since the copy control information is copied together with the video information, there is a problem that the illegal copy cannot be effectively prevented in this case.

The hard copy is such a copy that the reproduced signal from one information record medium on which the video information is recorded is recorded (i.e., copied) as it is onto another information record medium at a stage when the reproduced signal is an RF (Radio Frequency) signal. By the hard copy, the copy is conducted regardless of the existence of the copy control information.

SUMMARY OF THE INVENTION

It is therefore an object of the present invention to provide an information record medium, which can prevent information recorded thereon from being illegally copied even at a stage when the information is an RF (Radio Frequency) signal reproduced therefrom, and an apparatus for manufacturing such an information record medium.

The above object of the present invention can be achieved by an apparatus for manufacturing an information record medium such as an optical disc etc., which has a track such as a groove track etc., on which information is optically recorded. The apparatus is provided with: a track forming device such as a CPU etc., for forming the track; and a transition portion forming device such as a CPU etc., for forming a transition portion for transiting an irradiation position of a light beam, which is used for illegally copying the information on the formed track, from an irradiation track, which is irradiated by the light beam, to an adjacent track, which is adjacent to the irradiation track and on which the information is recorded before the information is recorded on the irradiation track, such that the formed transition portion is continuous with the formed track.

According to the apparatus for manufacturing the information record medium of the present invention, the track is formed by the track forming device. The transition portion for transiting the irradiation position of the light beam, which is used for illegally copying the information on the formed track, from the irradiation track to the adjacent track is formed by the transition portion forming device, such that the formed transition portion is continuous with the formed track. Accordingly, since the irradiation position of the light beam is transited from the irradiation track to the adjacent track in case of the illegal copy, it is repeated to over-write the information onto the already recorded information, so that the illegal copy of the information can be prevented. Therefore, even in such a case that one tries to copy the key data etc., for preventing the illegal copy together with the information itself, it is still possible to prevent the illegal copy.

In one aspect of the apparatus of the present invention, the information record medium is provided with a disc-shaped record medium, the track forming device forms the track in a spiral shape on the disc-shaped record medium. The transition portion forming device forms the transition portion to transit the irradiation position to the adjacent track, which is formed on an inner circumference side of the irradiation track, from the irradiation track.

According to this aspect, the transition portion to transit the irradiation position to the adjacent track, which is formed on an inner circumference side of the irradiation track, from the irradiation track is formed by the transition portion forming device.

Accordingly, since the information cannot be recorded onto the track other than the irradiation track and the adjacent track, it is possible to effectively prevent the illegal copy.

In this aspect, the information may be recorded on the track while a tracking servo is performed with respect to the light beam by using a reflection light of the light beam from the disc-shaped record medium. The transition portion forming device may form a plurality of transition pits, which are arranged in parallel to the irradiation track and the adjacent track between the irradiation track and the adjacent track within the transition portion, for transiting the irradiation position from the irradiation track to the adjacent track, and stops an formation of the irradiation track within an interval where the transition pits are formed. The track forming device may form the track newly on an outer circumference side of the transition portion.

In this case, a plurality of transition pits are formed, and the formation of the irradiation track is stopped within the interval. Then, the track is newly formed on the outer circumference side of the transition portion. Accordingly, by the existence of the transition pits, since the irradiation position of the light beam is certainly transited from the irradiation track to the adjacent track while the tracking servo is being performed, it is possible to surely prevent the illegal copy onto the track other than the irradiation track and the adjacent track.

Alternatively, in this aspect, the transition portion forming device may form the transition portion such that the irradiation track is continuous with the adjacent track within the transition portion. The track forming device may form the track newly on an outer circumference side of the transition portion.

In this case, the transition portion is formed such that the irradiation track is continuous with the adjacent track within the transition portion. Then, the track is newly formed on the outer circumference side of the transition portion. Accordingly, since it is repeated to emit the light beam, which has been emitted onto the irradiation track, onto the adjacent track as it is, it is possible to surely prevent the illegal copy onto the track other than the irradiation track and the adjacent track.

The above object of the present invention can be also achieved by an information record medium such as an optical disc etc., provided with: a track on which information is optically recorded; and a transition portion for transiting an irradiation position of a light beam, which is used for illegally copying the information on the formed track, from an irradiation track, which is irradiated by the light beam, to an adjacent track, which is adjacent to the irradiation track and on which the information is recorded before the information is recorded on the irradiation track, such that the formed transition portion is continuous with the formed track.

According to the information record medium of the present invention, the transition portion for transiting the irradiation position of the light beam, which is used for illegally copying the information on the formed track, from the irradiation track to the adjacent track is formed, such that the formed transition portion is continuous with the formed track. Accordingly, since the irradiation position of the light beam is transited from the irradiation track to the adjacent track in case of the illegal copy, it is repeated to over-write the information onto the already recorded information, so that the illegal copy of the information can be prevented. Therefore, even in such a case that one tries to copy the key data etc., for preventing the illegal copy together with the information itself, it is still possible to prevent the illegal copy.

In one aspect of the information record medium of the present invention, the information record medium is provided with a disc-shaped record medium. The track is formed in a spiral shape on the disc-shaped record medium. The transition portion is formed to transit the irradiation position to the adjacent track, which is formed on an inner circumference side of the irradiation track, from the irradiation track.

According to this aspect, the transition portion to transit the irradiation position to the adjacent track, which is formed on an inner circumference side of the irradiation track, from the irradiation track is formed. Accordingly, since the information cannot be recorded onto the track other than the irradiation track and the adjacent track, it is possible to effectively prevent the illegal copy.

In this aspect, the information may be recorded on the track while a tracking servo is performed with respect to the light beam by using a reflection light of the light beam from the disc-shaped record medium. The transition portion may be provided with (i) a plurality of transition pits, which are arranged in parallel to the irradiation track and the adjacent track between the irradiation track and the adjacent track within the transition portion, for transiting the irradiation position from the irradiation track to the adjacent track, and (ii) an end portion of the irradiation track within an interval where the transition pits are formed. Another track may be formed on an outer circumference side of the transition portion.

In this case, a plurality of transition pits are formed, and the formation of the irradiation track is stopped within the interval. Another track is formed on the outer circumference side of the transition portion. Accordingly, by the existence of the transition pits, since the irradiation position of the light beam is certainly transited from the irradiation track to the adjacent track while the tracking servo is being performed, it is possible to surely prevent the illegal copy onto the track other than the irradiation track and the adjacent track.

Alternatively, in this aspect, the transition portion may be formed such that the irradiation track is continuous with the adjacent track within the transition portion. Another track is formed on an outer circumference side of the transition portion.

In this case, the transition portion is formed such that the irradiation track is continuous with the adjacent track within the transition portion. Another track is formed on the outer circumference side of the transition portion. Accordingly, since it is repeated to emit the light beam, which has been emitted onto the irradiation track, onto the adjacent track as it is, it is possible to surely prevent the illegal copy onto the track other than the irradiation track and the adjacent track.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

In the embodiments described below, the present invention is applied to an optical disc, which has (i) a groove track as a track shaped in a spiral groove onto which information is recorded and (ii) a land track formed between adjacent turns of the groove track (the land track is formed with a height different from that of the groove track), and onto which the information can be optically recorded and from which the recorded information can be optically reproduced.

(I) First Embodiment

A first embodiment of the present invention is explained with reference to FIG. 1 to FIG. 5.

At first, a physical structure of an optical disc as an information record medium of the present invention is explained with reference to FIG. 1 and FIG. 2.

Figure 1:
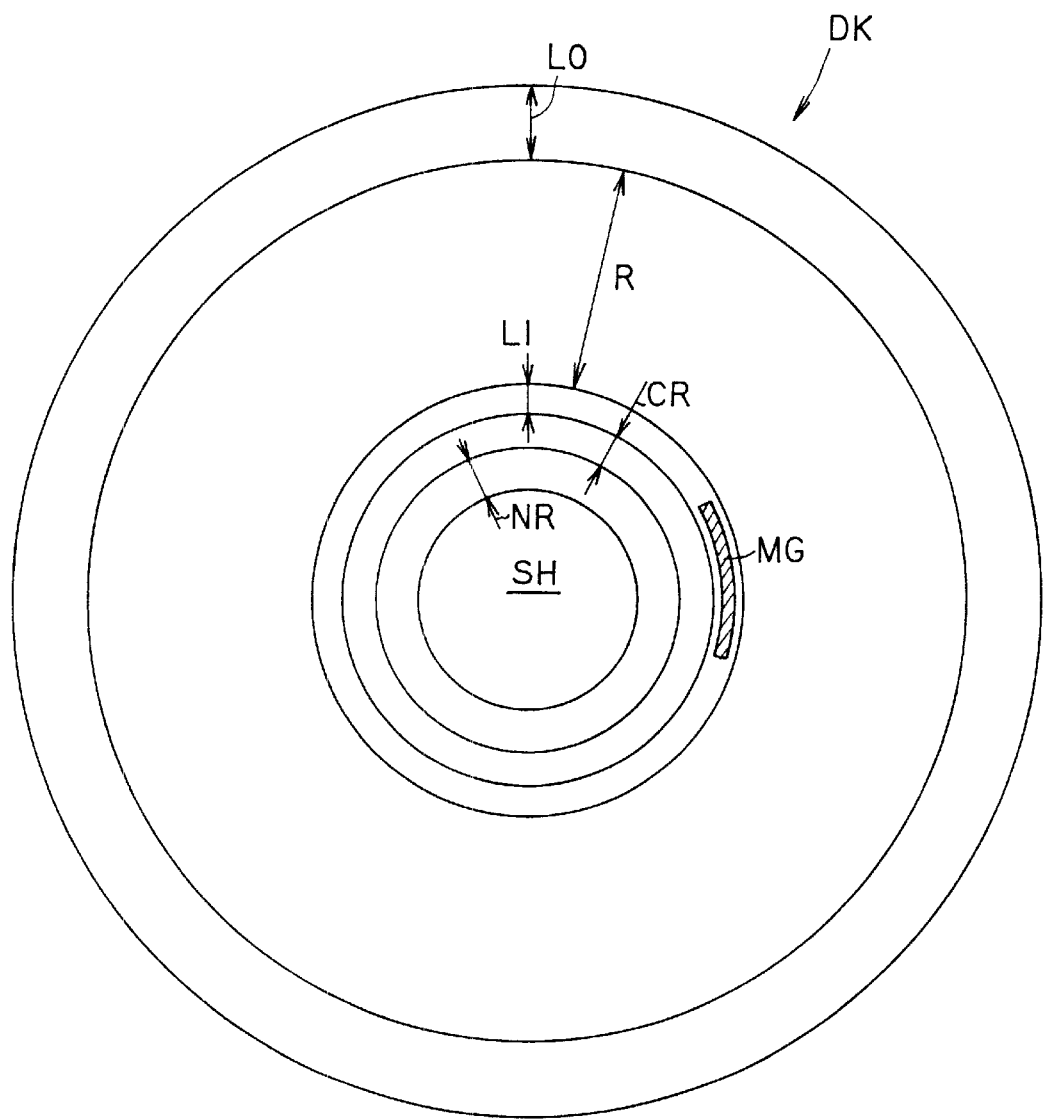
FIG. 1 is a plan view showing a structure of an optical disc in a first embodiment of the present invention.
Figure 2:
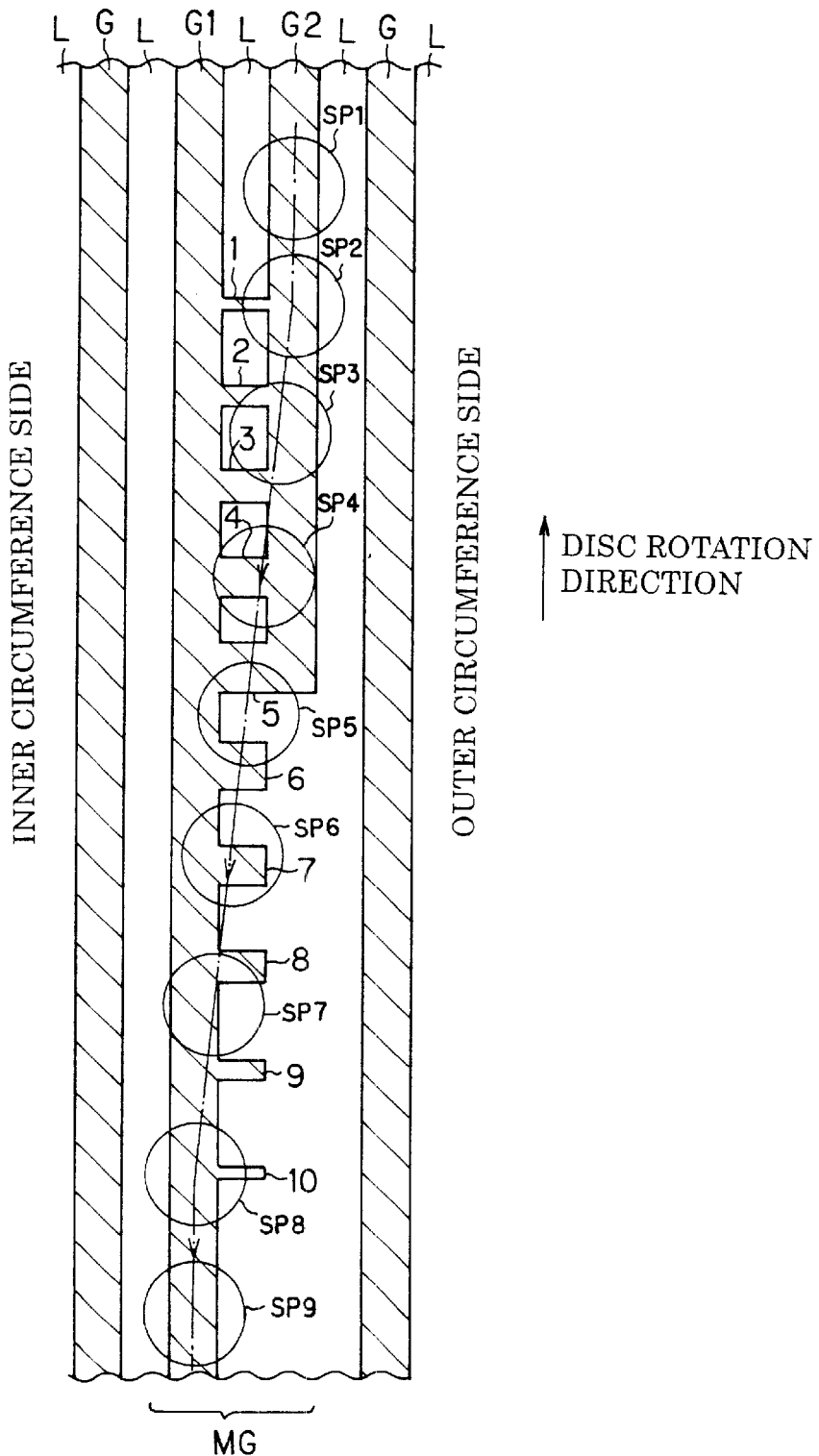
FIG. 2 is a magnified plan view showing a structure of a transition portion of the first embodiment.

FIG. 1 is a plan view of an optical disc DK of the first embodiment, and FIG. 2 is a magnified plan view of one portion of the optical disc DK.

As shown in FIG. 1, the optical disc DK of the first embodiment is provided, from an inner circumference side thereof, with: a non-record area NR to which a clamp aperture SH is formed for fixing the optical disc DK to a rotation shaft of a spindle motor of an information recording apparatus or an information reproducing apparatus; a record control area CR for recording in advance data for setting the intensity of a light beam at a time of recording the information onto the optical disc DK, data indicating at which position the recording is to be started at the time of recording the information and so on; a lead in area LI in which various information to start recording the information or start reproducing the information and copy right information as for the information recorded on the optical disc DK (more concretely, copy right holder, copy control information (i.e., copy control information indicating whether the information to be recorded is allowed to be copied just once or prohibited to be copied and the like), key data for dissolving a scramble process when recording the information with applying the scramble process, etc., ) are recorded; a record area R in which the information to be recorded is actually recorded; and a lead out area LO in which various information to end recording the information or end reproducing the information is recorded.

At this time, in the record control area CR, the lead in area LI, the record area R and the lead out area LO, the groove track and the land track adjacent to each other are spirally formed from the inner circumference side to the outer circumference side. The information is recorded with respect to the groove track sequentially from the inner circumference side to the outer circumference side.

As for a cross-sectional structure of the optical disc DK, it is provided with: a protection layer comprising ultra-violet hardening resin etc.,; a record layer in which the information is actually recorded; a substrate comprising transparent plastic material etc., which is a main body of the optical disc DK; and so on for example, in accordance with the corresponding information recording method or information reproducing method.

Here, in the optical disc DK of the first embodiment, a transition portion MG (which is indicated by hatching lines in FIG. 1) is formed in the lead in area LI. The transition portion MG is to transit a light spot, which is formed on the optical disc DK by a light beam used for the illegal copy, from one groove track currently irradiated with the light beam to another groove track which is located at an inner circumference side by one turn of the one groove track (i.e., to another groove track on which the information has been already recorded), when the information is to be illegally copied onto the optical disc DK.

Then, by this transition portion MG, at the time of the illegal copy, the light spot is not moved to the outer circumference side of the transition potion MG, resulting in that the illegal copy itself is impossible.

Next, a concrete structure of the transition portion MG of the present invention is explained with reference to the magnified plan view of FIG. 2. In FIG. 2, the portions, whose heights are same as that of the groove track, are indicated by hatching lines. Further, in FIG. 2, the groove track and the land track, which are actually in spiral shapes, are linearly indicated for the sake of a simple explanation.

As shown in FIG. 2, in the transition portion MG of the first embodiment, a groove track G2, as an irradiated track adjacent to a groove track G1 as an adjacent track having a same structure as another groove track G, has an end portion within the transition portion MG. Transition pits 1 to 10, each of which has a same height as the groove track G to transit the light spot SP gradually from the groove track G2 to the groove track G1, are formed between the groove track G1 and the groove track G2, and on the land track L for a predetermined length from the end of the groove track G2.

Then, the ratios of the lengths in the disc rotation direction of the transition pits 1 to 10 are as following in the order from the upper side of FIG. 2 (i.e., from the transition pit 1).

Transition Pit 1: Transition Pit 2: Transition Pit 3: Transition Pit 4: Transition Pit 5: Transition Pit 6: Transition Pit 7: Transition Pit 8: Transition Pit 9: Transition Pit 10=1: 2: 3: 4: 5: 5: 4: 3: 2: 1

Here, the operation of transiting the light spot from the groove track G2 to the groove track G1 by the transition pits 1 to 10 are explained with reference to FIG. 2. For example, in case that the light beam is emitted while it is tracking-servo-controlled by means of a so-called push-pull method at the time of recording the information, when the light spot SP1 which was initially on the groove track G2 arrives at the transition pit 1 within the transition portion MG (refer to the reference sign SP2 in FIG. 2), the reflection light amount from the half of the light spot SP2 on the left hand in FIG. 2 reduces to be less than the reflection light amount from the half of the light spot SP2 on the right hand in FIG. 2 by an amount corresponding to the transition pit 1.

Then, a tracking servo control unit, which is not illustrated, judges that the position of the light spot SP2 is shifted to the right hand side in FIG. 2, and moves the light spot SP2 toward the left hand side in FIG. 2 so as to make the reflection light amount from the left hand half and the reflection light amount from the right hand half coincident with each other.

In this condition, it is assumed that the light spot is moved to a position of the light spot SP3. When the light spot is positioned at the light spot SP3, the reflection light amount from the left hand half in FIG. 2 further reduces with respect to the reflection light amount from the right hand half in FIG. 2, due to the existence of the transition pits 2 and 3, each of which is longer than the transition pit 1.

Then, the tracking servo control unit judges that the position of the light spot SP3 is shifted to the right hand side in FIG. 2, and further moves the light spot SP3 toward the left hand side in FIG. 2 so as to make the reflection light amount from the left hand half and the reflection light amount from the right hand half coincident with each other.

Then, the above explained operation is repeatedly performed each time when the light spot is moved from the position of the transition pit 2 to the position of the transition pit 5 respectively, so that the position of the light spot is moved sequentially toward the groove track G1 as from the light spot SP2 to the light spot SP4 shown in FIG. 2.

After that, after the groove track G2 is ended at the position of the transition pit 5, such a condition that the reflection light amount from the right hand half in FIG. 2 within the light spot is larger than that from the left hand half is continued (refer to the light spots SP5 to SP8). Thus, the tracking servo control unit judges that the position of the light spot is shifted to the right hand side in FIG. 2, and moves the position of the light spot toward the left hand side in FIG. 2, to a position suitable for irradiating the groove track G1 as from the light spots SP5 to SP8 shown in FIG. 2.

Then, finally, the light spot, which was initially on the groove track G2, is moved to be positioned on the groove track G1 which is positioned on the inner circumference side by one turn of the groove track G2. At this time, the central position of the light spot in the middle of the transition is moved as indicated by a chain line in FIG. 2.

By virtue of the transition pits 1 to 10, the light beam repeats transiting from the groove track G1 to the groove track G2. Thus, the light beam cannot transit to another groove track G which is positioned on the outer circumference side of the groove track G2, resulting in that the illegal copy itself is impossible.

Next, an embodiment as for a cutting apparatus as an apparatus for manufacturing the information record medium, which is to manufacture the optical disc DK having the structure shown in FIG. 1 and FIG. 2 is explained with reference to FIG. 3 and FIG. 4.

Figure 3:
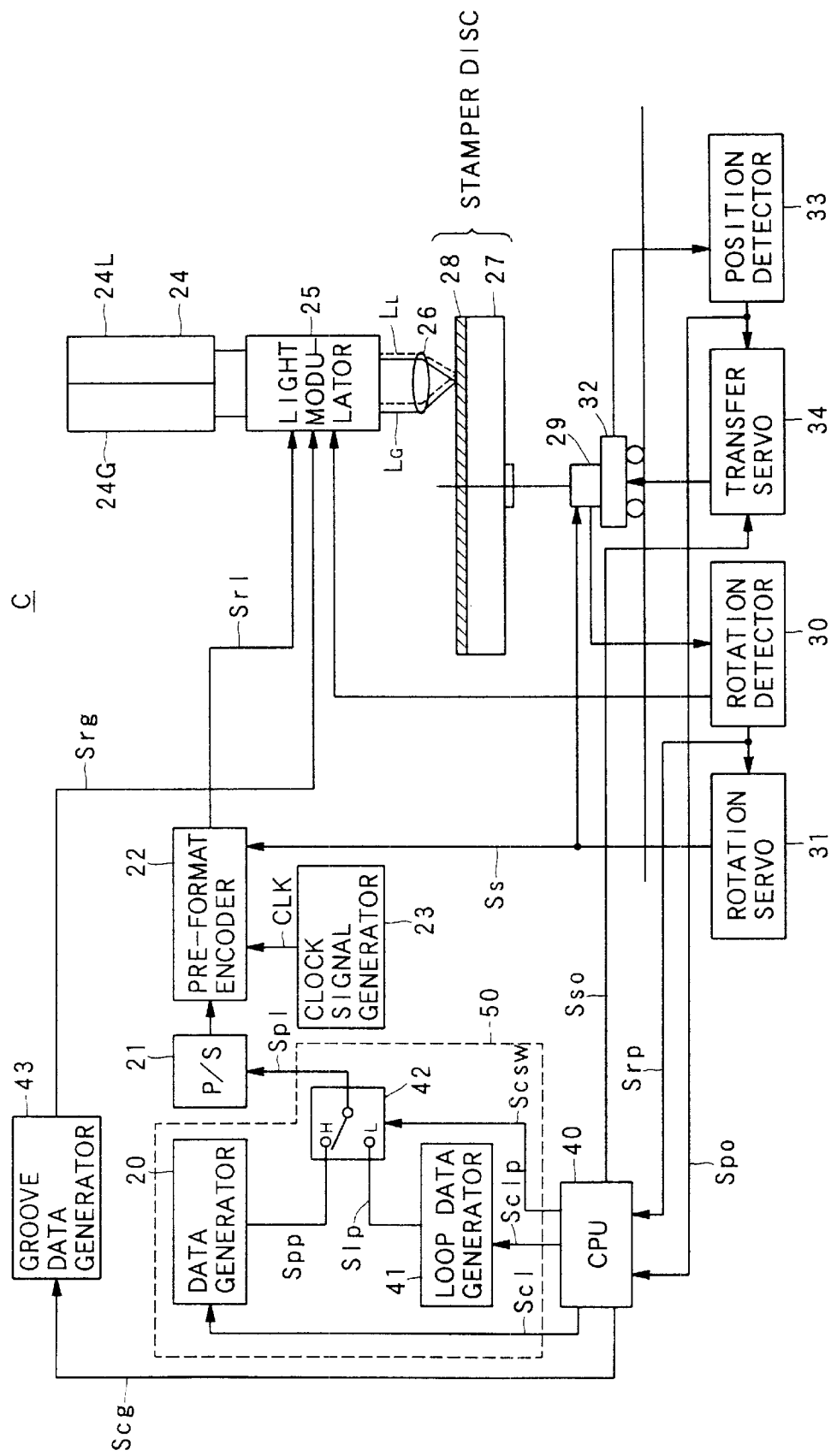
FIG. 3 is a block diagram showing a schematic construction of a cutting apparatus in the first embodiment.
Figure 4:
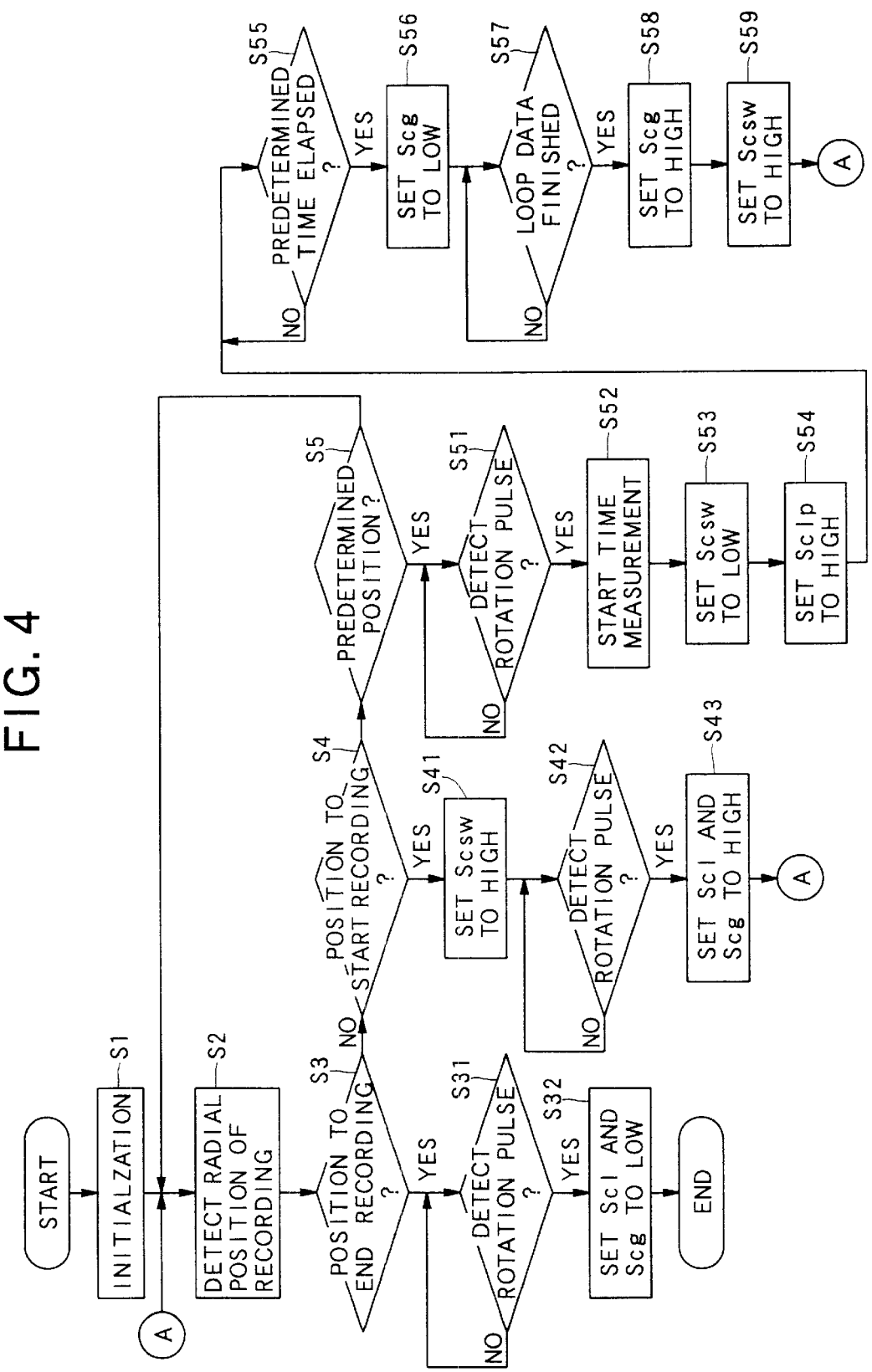
FIG. 4 is a flow chart showing a process of forming the transition portion in the first embodiment.

FIG. 3 is a block diagram showing a whole structure of the cutting apparatus in the first embodiment, and FIG. 4 is a flow chart showing a process performed mainly by a CPU 40 in order to form the above mentioned transition portion MG.

The cutting apparatus shown in FIG. 3 and FIG. 4 is to manufacture a stamper disc for mass-producing the optical disc on which the groove track G and the land track L including the transition portion MG are formed.

Further, it is assumed that, in the optical disc DK which is manufactured by the cutting apparatus C shown in FIG. 3, pre-pits in correspondence with various record control information to record the information onto the groove track G (e.g., address information on the optical disc DK etc.,) are formed on the land track L.

As shown in FIG. 3, a cutting apparatus C of the present embodiment is provided with: a land data generator 50; a groove data generator 43; a parallel/serial converter 21; a pre-format encoder 22; a clock signal generator 23; a laser generating device 24; a light modulator 25; an objective lens 26; a stamper disc; a spindle motor 29; a rotation detector 30; a rotation servo circuit 31; a transfer unit 32; a position detector 33; a transfer servo circuit 34; and a CPU 40 as one example of a track forming device and a transition portion forming device.

The land data generator 50 is provided with a data generator 20, a switch 42 and a loop data generator 41.

The stamper disc is provided with: a glass substrate 27 as one example of a main body of the stamper disc; and a resist (photo-sensitive material) 28, which is coated on the glass substrate 27 so as to form the transition pits 1 to 10 and the respective tracks. The laser generating device 24 is provided with an emission device 24G for emitting a light beam $L_G$ and an emission device 24L for emitting a light beam $L_L$.

Next, the operation of the cutting device is explained.

The land data generator 50 generates a land signal Spl to form the land track L, the transition pits 1 to 10 and the above mentioned pre-pits on the basis of a control signals Scl, Sclp and Scsw from the CPU 40, and outputs it to the parallel/serial converter 21.

Then, the parallel/serial converter 21 parallel/serial-converts the land signal Spl.

Then, the pre-format encoder 22 generates a land data signal Srl to actually form the land track L, the transition pits 1 to 10 and the above mentioned pre-pits on the stamper disc on the basis of the land signal Spl, which has been converted to the serial data, and the clock signal CLK for pre-formatting from the clock signal generator 23, and outputs it to the light modulator 25.

On the other hand, the groove data generator 43 generates a groove data signal Srg to actually form the above mentioned groove tracks G, G1 and G2 on the stamper disc (i.e., the groove data signal Srg to form the groove track G having a constant height into a continuous spiral shape) on the basis of a control signal Scg from the CPU 40 and outputs it to the light modulator 25.

The emission device 24G emits the light beam $L_G$ to form the groove tracks G, G1 and G2 shown in FIG. 2 with respect to the substrate of the optical disc DK. The emission device 24L emits the light beam $L_L$ to form the above mentioned land track L, the transition pits 1 to 10 and the transition portion MG.

Then, the light modulator 25 modulates the emitted light beam $L_L$ or $L_G$ by use of the land data signal Srl or the groove data signal Srg respectively.

By this, the objective lens 26 collects the light beam $L_G$ and $L_L$ onto the stamper disc.

At this time, the spindle motor 29 rotates the stamper disc.

Then, the rotation detector 30 detects the rotation number of the stamper disc, generates a rotation detection signal Srp, and outputs it to the rotation servo circuit 31 and the CPU 40.

By this, the rotation servo circuit 31 servo-controls the rotation of the stamper disc on the basis of the rotation detection signal Srp, generates an one-rotation detection signal Ss per each rotation of the stamper disc, and outputs it to the pre-format encoder 22.

Further, the transfer unit 32 transfer the spindle motor 29 and the stamper disc in the radial direction of the stamper disc in correspondence with the rotation of the stamper disc so as to form the groove track G and the land track L in the spiral shape.

At this time, the position detector 33 detects the position in the radial direction of the transfer unit 32, generates a position detection signal Spo, and outputs it to the transfer servo circuit 34 and the CPU 40.

Then, the transfer servo circuit 34 servo-controls the movement of the transfer unit 32 on the basis of a control signal Sso from the CPU 40 and the position detection signal Spo.

At this time, in the above mentioned operation, the light beam $L_L$ is modulated on the basis of the land data signal Srl by the light modulator 25, while the light beam $L_G$ is modulated on the basis of the groove data signal Srg by the light modulator 25. Then, the respective light beams $L_L$ and $L_G$ are emitted onto the stamper disc while they are being moved in the radial direction of the stamper disc.

Further, the light beam $L_L$ to form the land track L and the light beam $L_G$ to form the groove track G are emitted such that the irradiation positions are shifted to each other in the radial direction of the stamper disc. Thus, they form the land track L (which includes the transition portion MG) and the groove track G in a coaxial spiral shape simultaneously.

AT this time, the CPU 40 performs the processes explained below on the basis of the position detection signal Spo and the rotation detection signal Srp and outputs the above mentioned control signals Scg, Scl, Sclp and Scsw. The CPU 40 also controls the transfer servo circuit 34 by generating the control signal Sso and outputting it to the transfer servo circuit 34, so that it forms the groove track G including the transition portion MG and the land track L on the stamper disc.

Next, the schematic operation of each constitutional element in the land data generator 50 is explained.

At first, the data generator 20 generates a pre-data signal Spp corresponding to the above mentioned pre-pit to be formed on the land track L other than the transition portion MG on the basis of the control signal Scl from the CPU 40, and outputs it to one input terminal of the switch 42.

On the other hand, the loop data generator 41 generates a loop data signal Slp to form the above mentioned transition pits 1 to 10 in the transition portion MG on the basis of the control signal Sclp from the CPU 40, and outputs it to another input terminal of the switch 42.

Then, the switch 42 switches between the pre-data signal Spp and the loop data signal Slp on the basis of the control signal Scsw from the CPU 40, and outputs it as the above mentioned land signal Spl to the pre-format encoder 22.

Next, the manufacturing operation for the optical disc DK of the present invention, which is performed by the above mentioned cutting device C, is explained with reference to the flow chart shown in FIG. 4.

Incidentally, the operation shown by the flow chart explained below is an operation as for such a case, as one example, that the transition portion MG is formed at a predetermined radial position within the lead in area LI of the optical disc DK over a quarter circle area of the optical disc.

In the flow chart of FIG. 4, each formation of the tracks and the transition portion MG is simply described as "record" with respect to the optical disc DK.

In the process of forming the transition portion MG in the first embodiment, at first, the groove data generator 43 and the land data generator 50 are all initialized (step S1).

Then, on the basis of the position detection signal Spo, the current irradiation position of each light beam is recognized (step S2).

Then, it is judged whether or not the recognized position is coincident with the position to end recording on the optical disc DK (i.e., the most outer circumference potion of the lead out area LO) (step S3). If it is the position to end recording (step S3: YES), it is judged whether or not the one-rotation detection signal Ss is detected, so as to detect whether or not the pre-pits for one turn (i.e., the pre-pit indicating the position to end recording the information) are recorded or not at the position to end recording (step S31).

Then, if the one-rotation detection signal Ss is not detected (step S31: NO), the formation of the pre-pit is continued until it is detected. On the other hand, if the one-rotation detection signal Ss is detected (step S31: YES), the control signals Scl and Scg are set to "LOW" levels respectively so as to end the formation of the groove track G and the land track L. Thus, the operations of the data generator 20 and the groove data generator 43 are stopped (step S32), and the processes are ended.

On the other hand, according to the judgment at the step S3, if it is not the position to end recording (step S3: NO), it is judged whether or not the position recognized at the step S2 is coincident with the position to start recording on the optical disc DK (i.e., the most inner circumference portion of the record control area CR) (step S4). If it is coincident with the position to start recording (step S4: YES), the control signal Scsw is set to a "HIGH" level, so as to change the switch 42 to the side for the pre-data signal Spp (step S41).

Then, by detecting the one-rotation detection signal Ss, it is judged whether or not the record standard position in the circumferential direction (which is set per each turn of the optical disc DK in advance) on the stamper disc (i.e., the optical disc DK) is detected (step S42).

Then, if the record standard position is not detected (step S42: NO), it stands by until it is detected. If the record standard position is detected (step S42: YES), the control signals Scl and Scg are set to "HIGH" levels so as to form the groove track G, the land track L and the above mentioned pre-pits from this detected position. Thus, the generation and output of the groove data signal Srg and the land data signal Srl are started by operating the data generator 20 and the groove data generator 43, so as to form the groove track G, the land track L and the above mentioned pre-pits on the stamper disc DK (step S43). Then, the operation flow returns to the step S2 so as to search the next record standard position.

Next, according to the judgment at the step S4, if it is not coincident with the position to start recording (step S4: NO), it is judged whether or not the irradiation position recognized at the step S2 is coincident with the predetermined position within the lead in area LI where the transition portion MG is to be formed (step S5).

Then, if it is not coincident with the predetermined position (step S5: NO), the operation flow returns to the step S2 and the processes until this step are continued. On the other hand, if it is coincident with the predetermined position (step S5: YES), it is judged whether or not the above mentioned record standard position in the circumferential direction on the stamper disc is detected by detecting the one-rotation detection signal Ss (step S51).

Then, if the record standard position is not detected (step S51: NO), it stands by until it is detected. If it is detected (step S51: YES), a predetermined time duration (which is set in advance and stored in the CPU 40) from the pertinent record standard position to the position where the transition portion MG is to be formed with respect to the timing of detecting the pertinent record standard position as the time "0" is measured so as to detect the position where the transition position MG is to be formed (step S52).

Then, the control signal Scsw is changed to the "LOW" level at the timing when this measurement of the predetermined time duration is finished so as to switch the switch 42 to the side for the loop data signal Slp (step S53). The control signal Sclp is changed to the "HIGH" level so as to operate the loop data generator 41. Thus, the generation of the land data signal Srl is started so as to form the transition pits 1 to 10 on the land track L corresponding to the transition portion MG.

Figure 5:
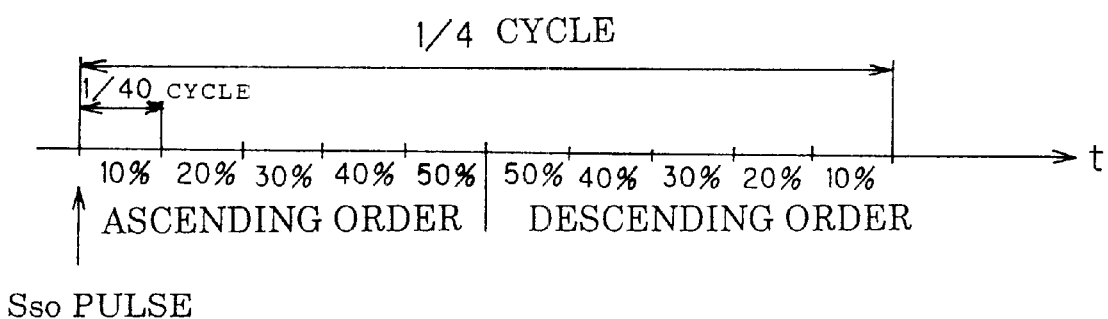
FIG. 5 is a diagram explaining a length of a transition pit in the first embodiment.

At this time, for example, the loop data generator 41 stores in advance five kinds of data for forming the transition pit (i.e., data changing to "HIGH" levels when forming the transition pits respectively), whose duty ratios are 10%, 20%, 30%, 40% and 50% respectively with respect to the wavelength of the light beam at the time of reproducing the information (e.g., 560 nm) as one period, for each data amount corresponding to one area which is obtained by equally dividing one quarter cycle area at the predetermined position on the optical disc DK by 10 (i.e., corresponding to 1/40 cycle area of the optical disc DK) in the order of ascending and descending as shown in FIG. 5, and outputs these data for forming the transition pits from a time point when the control signal Sclp is level-changed at the step S54.

Here, the data for forming the transition pits having the above mentioned duty ratios shown in FIG. 5 correspond to the transition pit 1 (10%), the transition pit 2 (20%), the transition pit 3 (30%), the transition pit 4 (40%), the transition pit 5 (50%), the transition pit 6 (50%), the transition pit 7 (40%), the transition pit 8 (30%), the transition pit 9 (20%) and the transition pit 10 (10%) respectively.

Next, when the generation of the land data Srl is started (step S54), it is judged whether or not the time duration corresponding to one-eighth cycle of the optical disc DK where the transition portion MG is to be formed has elapsed (step S55). If it has never elapsed (step S55: NO), the formation of the transition pits is continued as it is. If it has elapsed (step S55: YES), the control signal Scg is changed to the "LOW" level at that timing, so as to temporarily stop the operation of the groove data generator 43 and the emission of the light beam $L_G$. By this, the end portion of the groove track G2 in the transition portion MG shown in FIG. 2 is formed (step S56).

Next, it is judged whether or not the output of the above mentioned data for forming the transition pit is finished (step S57). If it is not finished (step S57: NO), the output of the data for the transition pit is continued as it is so as to continue the formation of the transition pit. On the other hand, if it is finished (step S57: YES), the control signal Scg is changed to the "HIGH" level since the formation of the transition portion MG is finished. The light beam $L_G$ is turned ON so that the formation of the groove track G at the outer circumference side of the transition portion MG is resumed (step S58). The control signal Scsw is changed to the "HIGH" level so as to switch the switch 42 to the side for the pre-data signal Spp. Thus, the formation of the land track L at the outer circumference side of the transition portion MG and the pre-pits are started (step S59). After that, the operation flow returns to the step S2 so as to repeat the operations until this step.

By the above explained operation shown in FIG. 4, the stamper disc, in which the groove track G and the land track L including the transition portion MG are formed, is completed.

After this, by using the stamper disc, a so-called replication process including a resin formation, a reflection film formation, a protection layer formation and so on are performed, so that the optical disc DK as a replica disc having the groove track G, the land track L and the transition portion MG is manufactured by means of a mass-production.

Incidentally, in case of recording the information formally with respect to the optical disc DK which is manufactured in the above mentioned manner, the information is recorded as the light beam for recording is emitted with skipping the transition portion MG. When formally reproducing the information, the light beam for reproducing is emitted with skipping the transition portion MG so as to reproduce the recorded information.

As described above, according to the cutting device C and the optical disc DK of the first embodiment, when illegally recording, since the irradiation position of the light beam is transited from the groove track G2 to the groove track G1, it is repeated to over-write the information onto the already recorded information between the groove track G1 and the groove track G2. Accordingly, the illegal copy of the information itself can be prevented.

Further, since the information is not recorded onto the track other than the groove track G1 and the groove track G2, it is possible to effectively prevent the illegal copy of the information.

Furthermore, by the existence of the transition pits 1 to 10, the irradiation position of the light beam is certainly transited from the groove track G2 to the groove track G1 while the tracking servo is being performed, so that the illegal copy can be surely prevented.

In the above described first embodiment, the case has been explained in which the length of the transition pits 1 to 10 in the rotation direction of the optical disc DK are sequentially changed. Other than that, if all of the lengths of the transition pits in the rotation direction are made uniformly corresponding to the data for forming the transition pit having the duty ratio 50% for example, the same effect can be obtained.

(II) Second Embodiment

Next, a second embodiment of the present invention is explained with reference to FIG. 6.

In the above described first embodiment, the transition portion MG is formed by forming the transition pits 1 to 10 between the groove track G1 and the groove track G2 and ending these within the transition portion MG. In contrast, in the second embodiment, the groove track G2 is formed such that the groove track G2 is directly connected to the groove track G1 located at the inner circumference side thereof.

Figure 6:
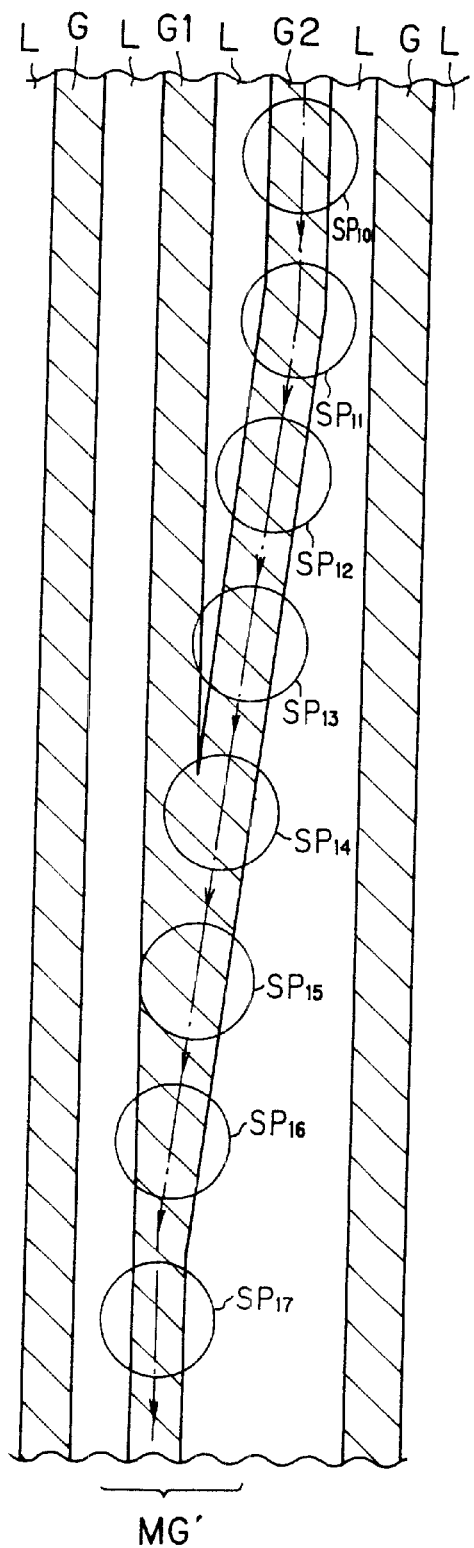
FIG. 6 is a magnified plan view showing a structure of a transition portion of a second embodiment of the present invention.

Namely, as shown in FIG. 6, the optical disc in the second embodiment is constructed such that the groove track G2, which is located at the outer circumference side within the transition portion MG', is directly connected to the groove track G1 which is located at the inner circumference side by one turn within the transition portion MG'.

By such a structure, the light spot formed on the groove track G2 (e.g., the light spot which is tracking-servo-controlled by the push-pull method in the same manner as the first embodiment) is transited naturally from the groove track G2 to the groove track G1 as indicated by reference marks SP10 to SP17 in FIG. 6.

Further, in case of forming the transition portion MG' in the second embodiment shown in FIG. 6, by temporarily stopping the movement of the transfer unit 32 in the area where the transition portion MG' is to be formed for an amount corresponding to one rotation of the optical disc in the cutting device shown in FIG. 3, the above explained groove G2 is formed to be naturally connected to the groove track G1 at the inner circumference side thereof.

After that, when the formation of the transition portion MG' is completed, the light beam $L_G$ is temporarily turned OFF and the movement of the transfer unit 32 is resumed. Then, the light beam $L_G$ is again emitted after 1/4 rotation of the optical disc for example, so that the transition portion MG' and the groove track G at the outer circumference side thereof can be formed as shown in FIG. 6.

As described above, according to the cutting device C and the optical disc DK of the second embodiment, when illegally recording, since the irradiation position of the light beam is transited from the groove track G2 to the groove track G1, it is repeated to over-write the information onto the already recorded information between the groove track G1 and the groove track G2. Accordingly, the illegal copy of the information itself can be prevented.

Further, since the information is not recorded onto the track other than the groove track G1 and the groove track G2, it is possible to effectively prevent the illegal copy of the information.

Furthermore, since the groove track G2 is formed such that the groove track G2 is connected to the groove track G1 within the transition portion MG', it is repeated to emit the light beam, which has been emitted onto the groove track G2, onto the groove track G1 as it is. Thus, the illegal copy can be surely prevented.

In each of the above described first and second embodiments, the case has been explained in which the present invention is applied to the optical disc DK having the groove track G and the land track L. Other than that, it is possible to apply the present invention to an information record medium in a disc shape, which has a track structure and is adapted to optically record and/or reproduce the information.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 10-138599 filed on May 20, 1998 including the specification, claims, drawings and summary is incorporated herein by reference in its entirety.

What is claimed is:

1. An information record medium comprising:
   a track on which information is optically recorded; and
   a transition portion for transiting an irradiation position of
      a light beam, which is used for illegally copying the information on the formed track, from an irradiation track, which is irradiated by the light beam, to an adjacent track, which is adjacent to the irradiation track and on which the information is recorded before the information is recorded on the irradiation track, such that the formed transition portion is continuous with the formed track, wherein said information record medium comprises a disc-shaped record medium;

the track is formed in a spiral shape on said disc-shaped record medium;

the transition portion is formed to transit the irradiation position to the adjacent track, which is formed on an inner circumference side of the irradiation track, from the irradiation track;

the information is recorded on the track while a tracking servo is performed with respect to the light beam by using a reflection light of the light beam from said disc-shaped record medium;

the transition portion comprises (i) a plurality of transition pits, which are arranged in parallel to the irradiation track and the adjacent track between the irradiation track and the adjacent track within the transition portion, for transiting the irradiation position from the irradiation track to the adjacent track, and (ii) an end portion of the irradiation track within an interval where the transition pits are formed; and another track is formed on an outer circumference side of the transition portion.

* * * * *